US008078123B2

(12) United States Patent
Behzad et al.

(10) Patent No.: US 8,078,123 B2
(45) Date of Patent: Dec. 13, 2011

(54) RF TRANSMISSION ERROR DETECTION AND CORRECTION MODULE

(75) Inventors: Arya Reza Behzad, Poway, CA (US); Adedayo Ojo, San Diego, CA (US); C. Paul Lee, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1544 days.

(21) Appl. No.: 11/180,341

(22) Filed: Jul. 13, 2005

(65) Prior Publication Data

US 2006/0236188 A1 Oct. 19, 2006

Related U.S. Application Data

(60) Provisional application No. 60/666,212, filed on Mar. 29, 2005.

(51) Int. Cl.
*H04B 1/04* (2006.01)
(52) U.S. Cl. ............... 455/114.2; 332/105; 332/149; 332/153
(58) Field of Classification Search ............... 455/114.2
See application file for complete search history.

(56) References Cited

U.S. PATENT DOCUMENTS

| | | | | |
|---|---|---|---|---|
| 5,699,383 | A * | 12/1997 | Ichiyoshi | 375/297 |
| 6,424,630 | B1 * | 7/2002 | Ang | 370/251 |
| 6,700,453 | B2 * | 3/2004 | Heiskala et al. | 332/103 |
| 7,466,768 | B2 * | 12/2008 | Su et al. | 375/324 |
| 2004/0132424 | A1 * | 7/2004 | Aytur et al. | 455/335 |
| 2005/0075815 | A1 * | 4/2005 | Webster et al. | 702/106 |

OTHER PUBLICATIONS

"A Single-Chip Digitally Calibrated 5.15-5.825-GHz 0.18-um CMOS Transceiver for 802.11a Wireless LAN" by Vassiliou, et al, IEEE Journal of Solid-State Circuit vol. 38, No. 12, Dec. 2003.
"A Single-Chip Dual-Band Tri-Mode CMOS Transceiver for IEEE 802.11a/b/g WLAN" by Zargari, et al, ISSCC 2004/Session 5/WLAN Transceivers/5.4;2004 IEEE International Solid-State Circuits Conference.

* cited by examiner

*Primary Examiner* — Duc Nguyen
*Assistant Examiner* — Ajibola Akinyemi
(74) *Attorney, Agent, or Firm* — Garlick Harrison & Markison; Jessica W. Smith (57) ABSTRACT

A radio frequency (RF) transmission correction module includes an RF transmission error detection module and a correction module. The error detection module includes an RF envelope detector, a signal conversion module, and an error detection module. The RF envelope detector is operably coupled to produce an envelope signal from a transmit RF signal, wherein the envelope signal represents at least one of local oscillation leakage and in-phase (I) and quadrature (Q) imbalance. The signal conversion module is operably coupled to convert the envelope signal into an error signal in accordance with baseband processing of the transmit RF signal. The error detection module is operably coupled to determine at least one of a local oscillation leakage value and an I and Q imbalance value from the error signal. The correction module is operably coupled to produce at least one of a local oscillation leakage correction signal and an I and Q imbalance correction signal based on the at least one of the local oscillation leakage value and the I and Q imbalance value, respectively.

12 Claims, 7 Drawing Sheets

RF TRANSMISSION ERROR DETECTION AND CORRECTION MODULE

CROSS REFERENCE TO RELATED PATENTS

This invention is claiming priority under 35 USC §119(e) to a provisionally filed patent application having the same title as the present patent application, a filing date of Mar. 29, 2005 and an application No. of 60/666,212.

BACKGROUND OF THE INVENTION

1. Technical Field of the Invention

This invention relates generally to wireless communication systems and more particularly to radio frequency (RF) transmission error detection and correction.

2. Description of Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to an antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via the antenna.

In many transmitters, the baseband signals include an in-phase component and a quadrature component, which are mixed with an in-phase (I) component and a (Q) quadrature component of the local oscillation, respectively. The resulting mixed signals are summed together and filtered to produce an RF signal. As is known, an imbalance (e.g., magnitude difference and/or phase offset) between the in-phase and quadrature components of the baseband signal adversely affects signal integrity of the RF signal. In general, signal integrity of an RF signal corresponds to the rate of data that may be reliably conveyed via a wireless transmission. For instance, the greater the signal integrity of an RF signals, the great the data rate. Another issue that affects the signal integrity of RF signals is mismatches in the mixers that produce what is generally referred to a local oscillation leakage (LO leakage).

There are many techniques to compensate and/or correct IQ imbalance and/or LO leakage. Such techniques are typically done in a static manner during a calibration operation of the transmitter. As such, when the transmitter is actively producing RF signals, it uses the static calibration to compensate and/or correct for IQ imbalance and/or LO leakage. However, such static calibrations may not adequately compensate for dynamic changes within the transmitter during an RF transmission.

Therefore, a need exists for an RF transmission error detection and correction module that provides a more dynamic detection and/or correction of IQ imbalance and/or LO leakage.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE INVENTION

Figure 1:
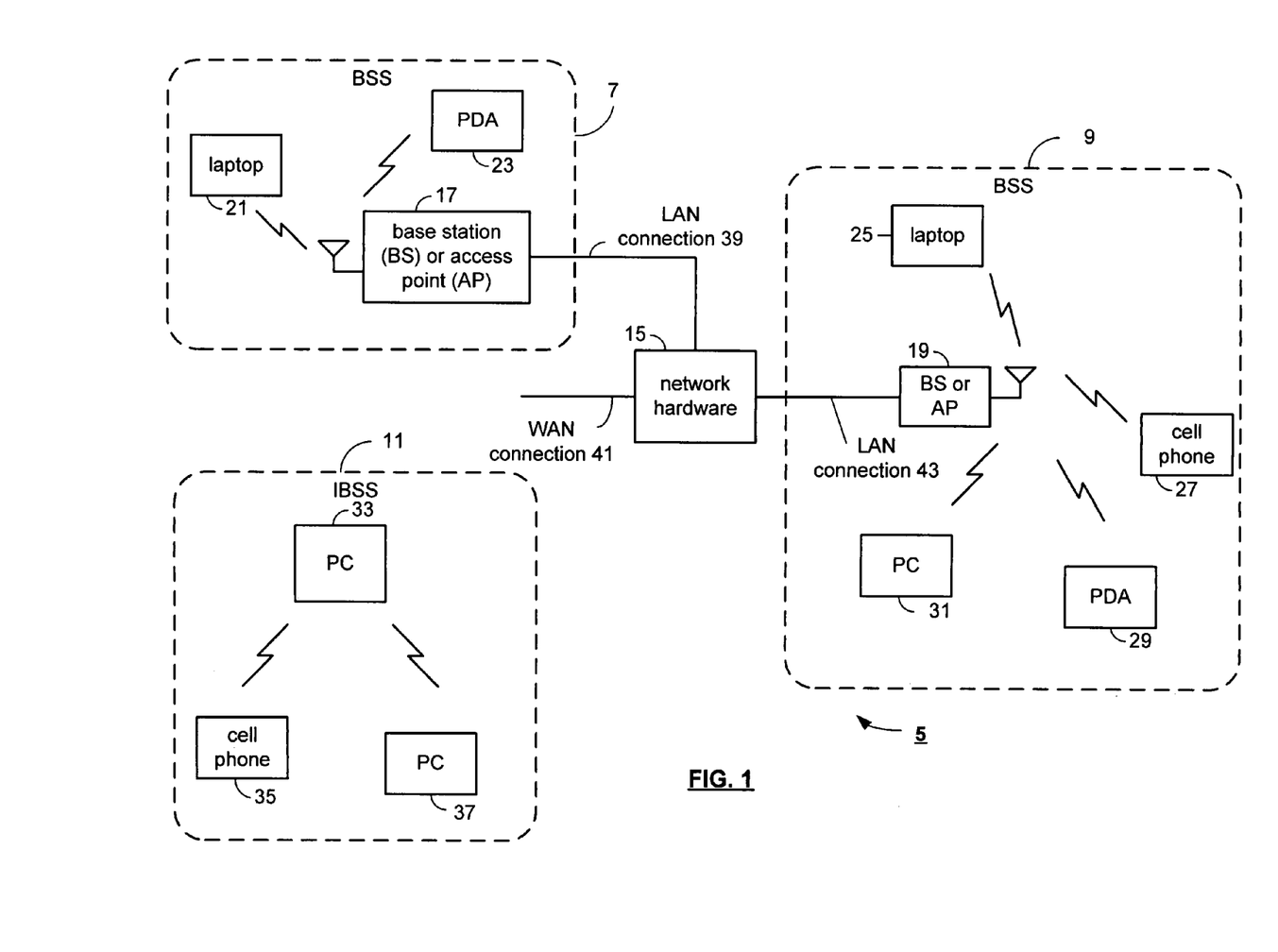
FIG. 1 is a schematic block diagram of a wireless communication system in accordance with the present invention.

FIG. 1 illustrates a schematic block diagram of a communication system 5 that includes basic service set (BSS) areas 7 and 9, an independent basic service set (IBSS) 11, and a network hardware device 15. Each of the BSS areas 7 and 9 include a base station and/or access point 17, 19 and a plurality of wireless communication devices 21-23, 25-31. The IBSS 11 includes a plurality of wireless communication devices 33-37. Each of the wireless communication devices 21-37 may be laptop host computers 21 and 25, personal digital assistant hosts 23 and 29, personal computer hosts 31 and 33 and/or cellular telephone hosts 27 and 35.

The base stations or access points 17 and 19 are operably coupled to the network hardware 15 via local area network connections 39 and 43. The network hardware 15, which may be a router, switch, bridge, modem, system controller, et cetera provides a wide area network connection 41 for the communication system 5. Each of the base stations or access points 17, 19 has an associated antenna or antenna array to communicate with the wireless communication devices in its area. Typically, the wireless communication devices register with a particular base station or access point 17, 19 to receive services from the communication system 5. For direct connections (i.e., point-to-point communications) within IBSS 11, wireless communication devices 33-37 communicate directly via an allocated channel.

Typically, base stations are used for cellular telephone systems and like-type systems, while access points are used for in-home or in-building wireless networks. Regardless of the particular type of communication system, each wireless communication device includes a built-in radio transceiver and/or is coupled to a radio transceiver to facilitate direct and/or in-direct wireless communications within the communication system 5.

Figure 2:
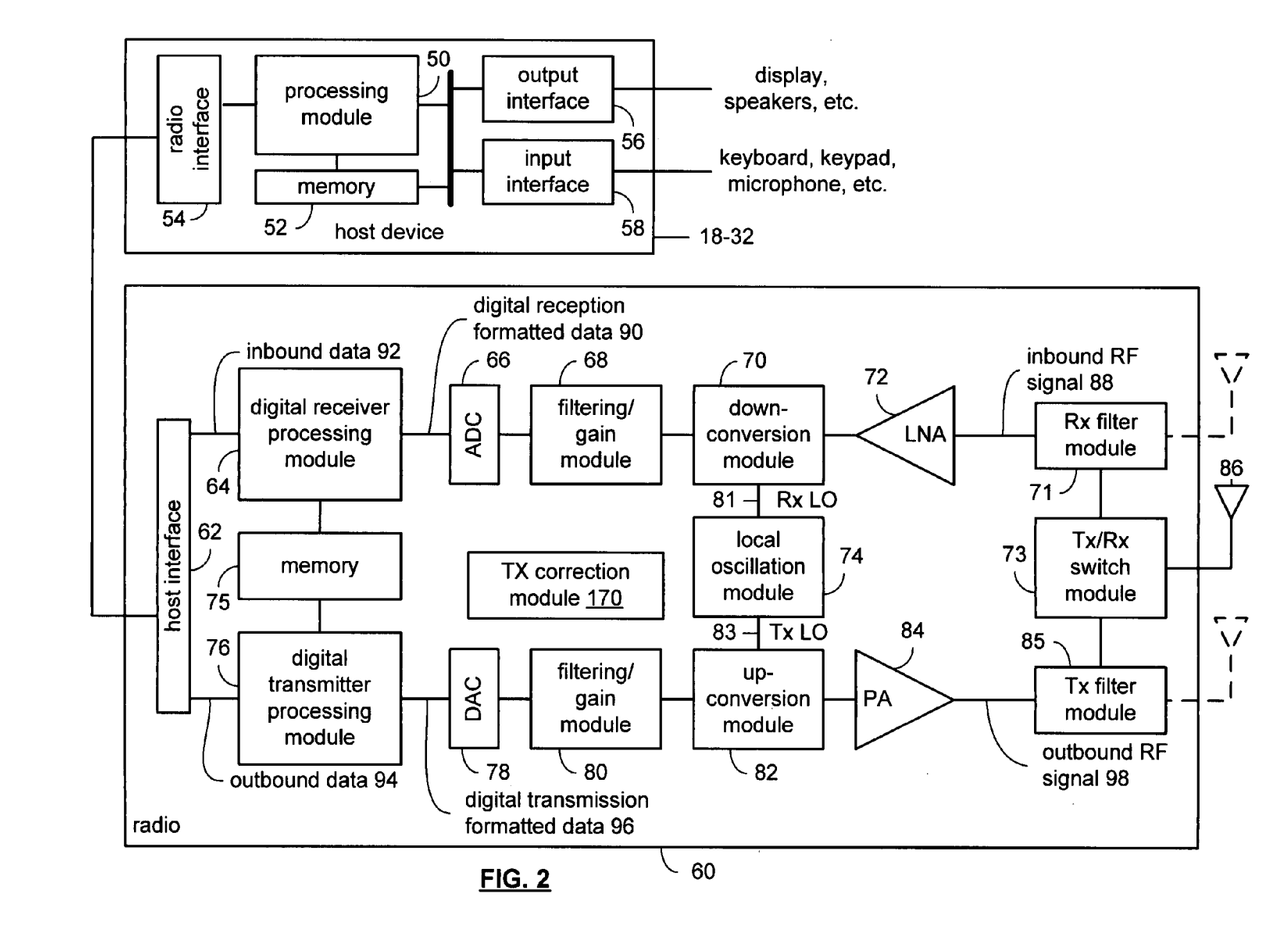
FIG. 2 is a schematic block diagram of a wireless communication device in accordance with the present invention.

FIG. 2 illustrates a schematic block diagram of a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, analog-to-digital converter 66, filtering/gain module 68, down conversion module 70, low noise amplifier 72, local oscillation module 74, memory 75, digital transmitter processing module 76, digital-to-analog converter 78, filtering/gain module 80, up-conversion module 82, power amplifier 84, and an antenna 86. The antenna 86 may be a single antenna that is shared by the transmit and receive paths or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE802.11a, IEEE802.11b, Bluetooth, et cetera) to produce digital transmission formatted data 96. The digital transmission formatted data 96 will be a digital base-band signal or a digital low IF signal, where the low IF will be in the frequency range of zero to a few megahertz.

The digital-to-analog converter 78 converts the digital transmission formatted data 96 from the digital domain to the analog domain. The filtering/gain module 80 filters and/or adjusts the gain of the analog signal prior to providing it to the up-conversion module 82. The up-conversion module 82 directly converts the analog baseband or low IF signal into an RF signal based on a transmitter local oscillation provided by local oscillation module 74. The power amplifier 84, which may include the highly linear power amplifier discussed in FIG. 9 and/or the programmable power amplifier discussed in FIGS. 3-7, amplifies the RF signal to produce outbound RF signal 98. The antenna 86 transmits the outbound RF signal 98 to a targeted device such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the low noise amplifier 72, which amplifies the signal 88 to produce an amplified inbound RF signal. The low noise amplifier 72 provide the amplified inbound RF signal to the down conversion module 70, which directly converts the amplified inbound RF signal into an inbound low IF signal based on a receiver local oscillation provided by local oscillation module 74. The down conversion module 70 provides the inbound low IF signal to the filtering/gain module 68, which filters and/or adjusts the gain of the signal before providing it to the analog to digital converter 66.

The analog-to-digital converter 66 converts the filtered inbound low IF signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host device 18-32 via the radio interface 54.

Figure 3:
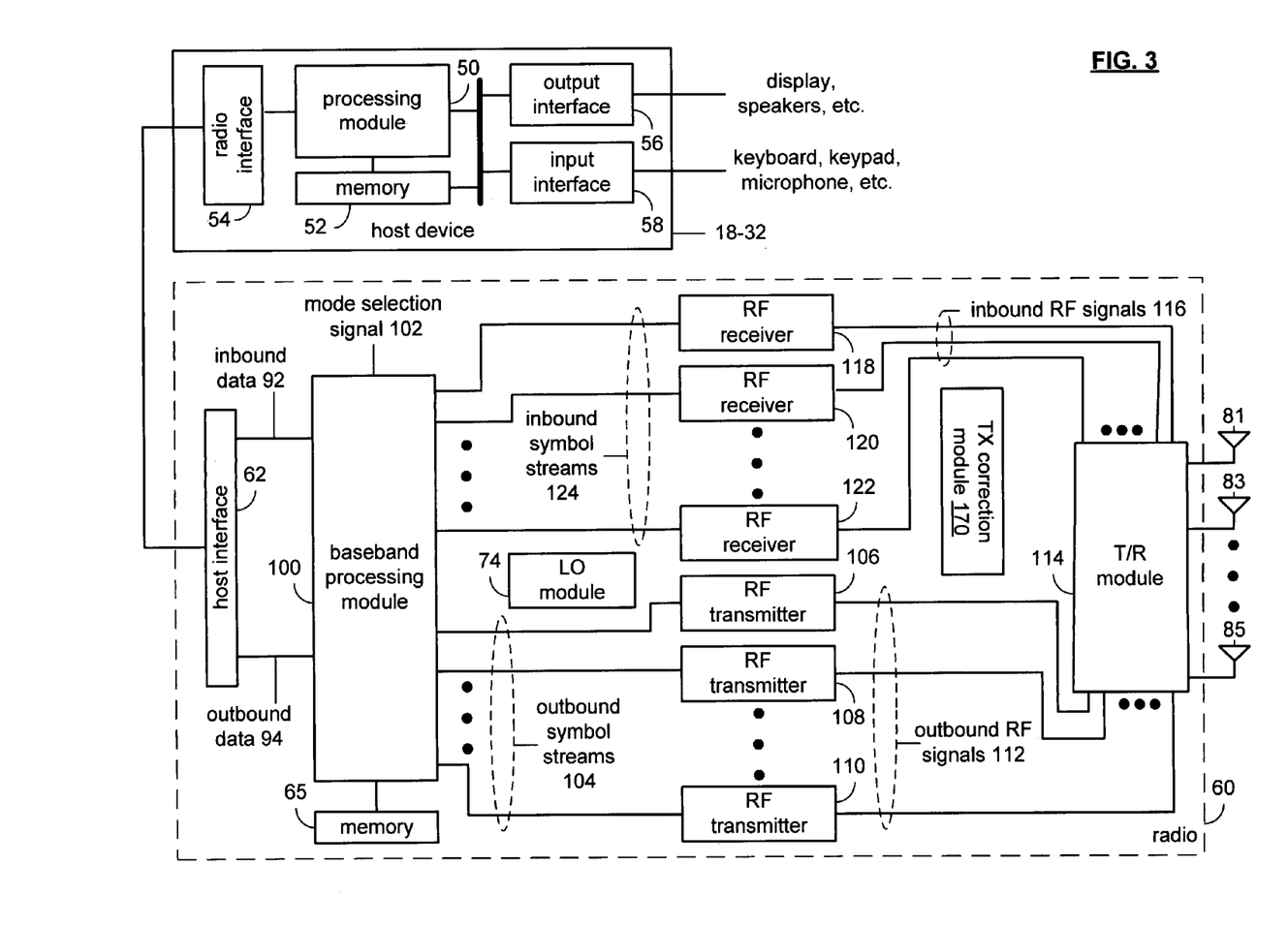
FIG. 3 is a schematic block diagram of another wireless communication device in accordance with the present invention.

FIG. 3 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, a baseband processing module 100, memory 65, a plurality of radio frequency (RF) transmitters 106-110, a transmit/receive (T/R) module 114, a plurality of antennas 81-85, a plurality of RF receivers 118-120, a channel bandwidth adjust module 87, and a local oscillation module 74. The baseband processing module 100, in combination with operational instructions stored in memory 65, executes digital receiver functions and digital transmitter functions, respectively. The digital receiver functions include, but are not limited to, digital intermediate frequency to baseband conversion, demodulation, constellation demapping, decoding, de-interleaving, fast Fourier transform, cyclic prefix removal, space and time decoding, and/or descrambling. The digital transmitter functions include, but are not limited to, scrambling, encoding, interleaving, constellation mapping, modulation, inverse fast Fourier transform, cyclic prefix addition, space and time encoding, and digital baseband to IF conversion. The baseband processing modules 100 may be implemented using one or more processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 65 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 100 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The baseband processing module 64 receives the outbound data 88 and, based on a mode selection signal 102, produces one or more outbound symbol streams 90. The mode selection signal 102 will indicate a particular mode of operation that is compliant with one or more specific modes of the various IEEE 802.11 standards. For example, the mode selection signal 102 may indicate a frequency band of 2.4 GHz, a channel bandwidth of 20 or 22 MHz and a maximum bit rate of 54 megabits-per-second. In this general category, the mode selection signal will further indicate a particular rate ranging from 1 megabit-per-second to 54 megabits-per-second. In addition, the mode selection signal will indicate a particular type of modulation, which includes, but is not limited to, Barker Code Modulation, BPSK, QPSK, CCK, 16 QAM and/or 64 QAM. The mode select signal 102 may also include a code rate, a number of coded bits per subcarrier (NBPSC), coded bits per OFDM symbol (NCBPS), and/or data bits per OFDM symbol (NDBPS). The mode selection signal 102 may also indicate a particular channelization for the corresponding mode that provides a channel number and corresponding center frequency. The mode select signal 102 may further indicate a power spectral density mask value and a number of antennas to be initially used for a MIMO communication.

The baseband processing module 100, based on the mode selection signal 102 produces one or more outbound symbol streams 104 from the outbound data 94. For example, if the mode selection signal 102 indicates that a single transmit antenna is being utilized for the particular mode that has been selected, the baseband processing module 100 will produce a single outbound symbol stream 104. Alternatively, if the mode select signal 102 indicates 2, 3 or 4 antennas, the baseband processing module 100 will produce 2, 3 or 4 outbound symbol streams 104 from the outbound data 94.

Depending on the number of outbound streams 104 produced by the baseband module 10, a corresponding number of the RF transmitters 106-110 will be enabled to convert the outbound symbol streams 104 into outbound RF signals 112. In general, each of the RF transmitters 106-110 includes a digital filter and upsampling module, a digital to analog conversion module, an analog filter module, a frequency up conversion module, a power amplifier, and a radio frequency bandpass filter. The RF transmitters 106-110 provide the outbound RF signals 112 to the transmit/receive module 114, which provides each outbound RF signal to a corresponding antenna 81-85.

When the radio 60 is in the receive mode, the transmit/receive module 114 receives one or more inbound RF signals 116 via the antennas 81-85 and provides them to one or more RF receivers 118-122, which will be described in greater detail with reference to FIG. 4. The RF receiver 118-122, based on settings provided by the channel bandwidth adjust module 87, converts the inbound RF signals 116 into a corresponding number of inbound symbol streams 124. The number of inbound symbol streams 124 will correspond to the particular mode in which the data was received. The baseband processing module 100 converts the inbound symbol streams 124 into inbound data 92, which is provided to the host device 18-32 via the host interface 62.

As one of average skill in the art will appreciate, the wireless communication device of FIG. 3 may be implemented using one or more integrated circuits. For example, the host device may be implemented on one integrated circuit, the baseband processing module 100 and memory 65 may be implemented on a second integrated circuit, and the remaining components of the radio 60, less the antennas 81-85, may be implemented on a third integrated circuit. As an alternate example, the radio 60 may be implemented on a single integrated circuit. As yet another example, the processing module 50 of the host device and the baseband processing module 100 may be a common processing device implemented on a single integrated circuit. Further, the memory 52 and memory 65 may be implemented on a single integrated circuit and/or on the same integrated circuit as the common processing modules of processing module 50 and the baseband processing module 100.

Figure 4:
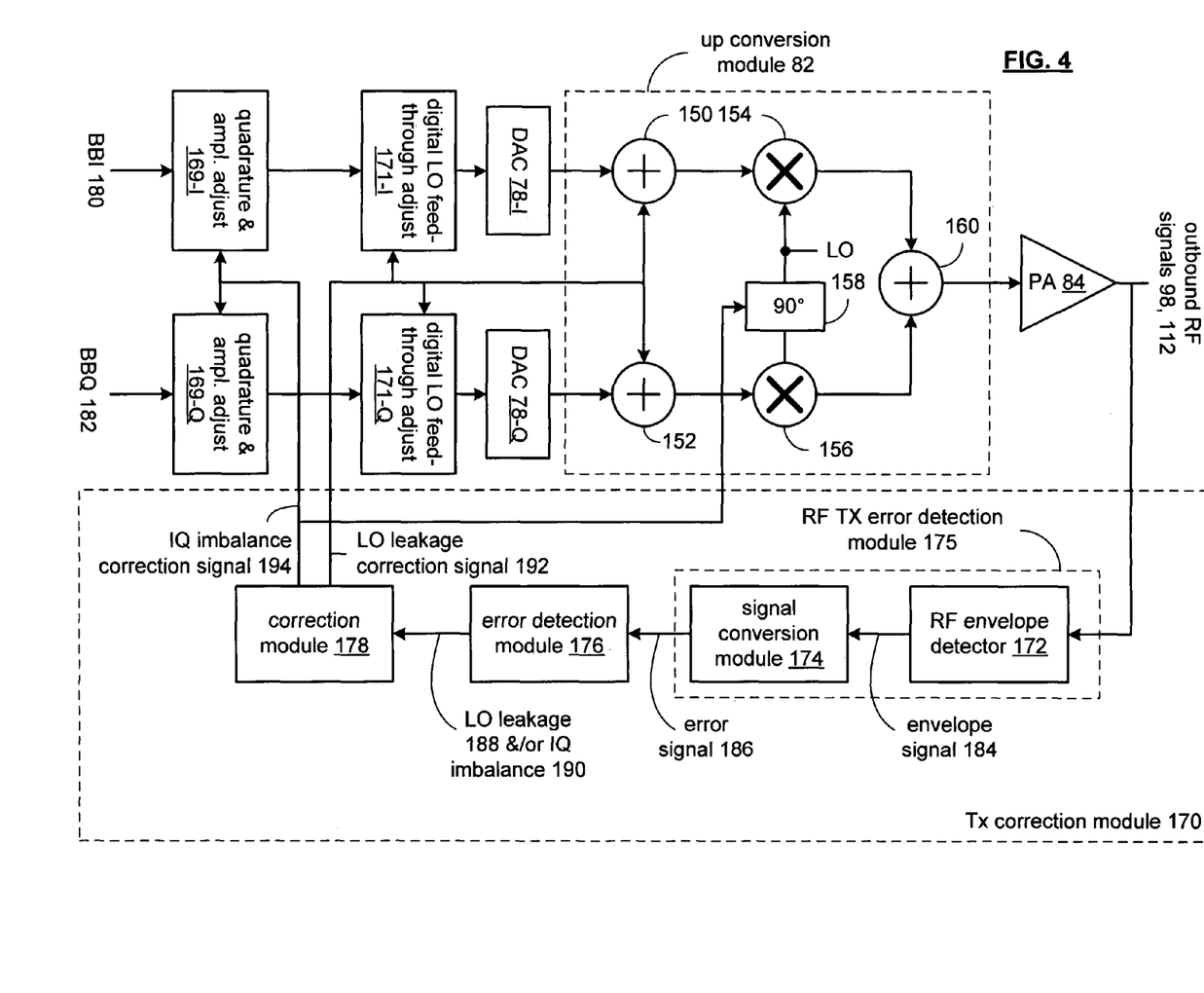
FIG. 4 is a schematic block diagram of a transmit correction module operably coupled to a portion of a transmitter in accordance with the present invention.

FIG. 4 is a schematic block diagram of the transmission correction module 170 operably coupled to a portion of the baseband TX processing module, the up-conversion module 82 and the power amplifier 84 of an RF transmitter section of the wireless communication device of FIG. 2 and/or of FIG. 3. The portion of the baseband TX processing module includes quadrature & amplitude adjust modules 169-I and 169-Q and digital LO feed-through adjust modules 171-I and 171-Q. The up conversion module 82 includes a mixing module and summation modules 150 and 152. The mixing module includes multipliers 154, 156, 90° phase shift module 158, and summation module 160. The summation modules 150 and 152, the quadrature & amplitude adjust modules 169-I and 169-Q and/or the digital LO feed-through adjust modules 171-I and 171-Q comprise an offset correction module for the RF transmitter section. The transmission correction module 170 includes an RF transmission error detection module 175, an error detection module 176, and a correction module 178. The RF transmission error detection module 175 includes an RF envelope detector 172 and a signal conversion module 174. The up-conversion module 82 of the transmitter section of a wireless communication device includes a pair of summation modules 150 and 152, a pair of mixers 154 and 156, a 90°phase shift module 158 and a summation module 160.

In operation, the RF detection module 172 monitors the outbound RF signals 98 and/or 112 and produces therefrom an envelope signal 184. The envelope signal 184 represents local oscillation (LO) leakage and/or in-phase/quadrature (IQ) imbalance. In general, if the outbound RF signals 98 and/or 112 are free of LO leakage components and IQ imbalance components, the envelope signal 184 will have a constant magnitude. Conversely, when LO leakage and/or IQ imbalance is present in the outbound RF signals 98 and/or 112, the magnitude of the envelope signal 184 will vary corresponding to the amount of LO leakage and/or IQ imbalance. This will be described in greater detail with reference to FIG. 5.

The signal conversion module 174 converts the envelope signal 184 into an error signal 186 in accordance with the baseband processing of the transmitter producing the outbound RF signals 98. In one embodiment, the baseband processing is in accordance with IEEE 802.11a and in another embodiment, the baseband processing is in accordance with IEEE 802.11g. The RF transmission error detection module 175 will be discussed in greater detail with reference to FIGS. 5-7.

The error detection module 176 is operably coupled to determine LO leakage 188 and/or IQ imbalance 190 from the error signal 186. In one embodiment, the error detection module includes a time domain to frequency domain conversion module that is operably coupled to convert the error signal from a time domain to a frequency domain. In this embodiment, the error signal includes, in the frequency domain, a local oscillation leakage component and an IQ imbalance component. In another embodiment, the error detection module 176 may include a fast Fourier transform module.

The correction module 176 is operably coupled to determine an LO leakage correction signal 192 and/or an IQ imbalance correction signal 194 from the LO leakage 188 and the IQ imbalance 190. In one embodiment, the correction module 176 functions to determine magnitude of the local oscillation leakage component and magnitude of the IQ imbalance component. The correction module 176 then generates at least one of the local oscillation leakage correction signal and the IQ imbalance correction signal based on the corresponding magnitudes of the signals.

The correction module 176 may provide the IQ imbalance correction signal 194 to the quadrature & amplitude adjust modules 169-I and 169-Q and/or to the 90° phase shift module 158. The quadrature & amplitude adjust modules 169-I and 169-Q digitally adjust the quadrature relationship between the I baseband signals 180 and the Q baseband signals 182 in accordance with the IQ imbalance correction signal. In addition to, or as an alternative, the 90° phase shift module 158 may adjust the quadrature relationship between the analog I and Q local oscillation signals such that, when mixed with the analog I and Q signals, the resulting mixed signals have a corrected quadrature relationship.

In addition to, or as an alternative, to providing the IQ imbalance correction signal 194 to the quadrature & amplitude adjust modules 169-I and 169-Q and/or to the 90°phase shift module 158, the correction module 176 may provide the LO leakage correction signal 192 to the digital LO feed-through adjust modules 171-I and 171-Q and/or to the summation modules 150 and 152. The digital LO feed-through adjust modules 171-I and 171-Q digitally adjust, in accordance with the LO leakage correction signal 192, for local oscillation (LO) leakage produced by the imperfections of the mixers 154 and 156 and/or other analog components in the up-conversion module 82. In addition to, or as an alternative, the summation module 150 and/or 152 may offset the incoming I and/or Q signals in accordance with the LO leakage correction signal 192.

Figure 5:
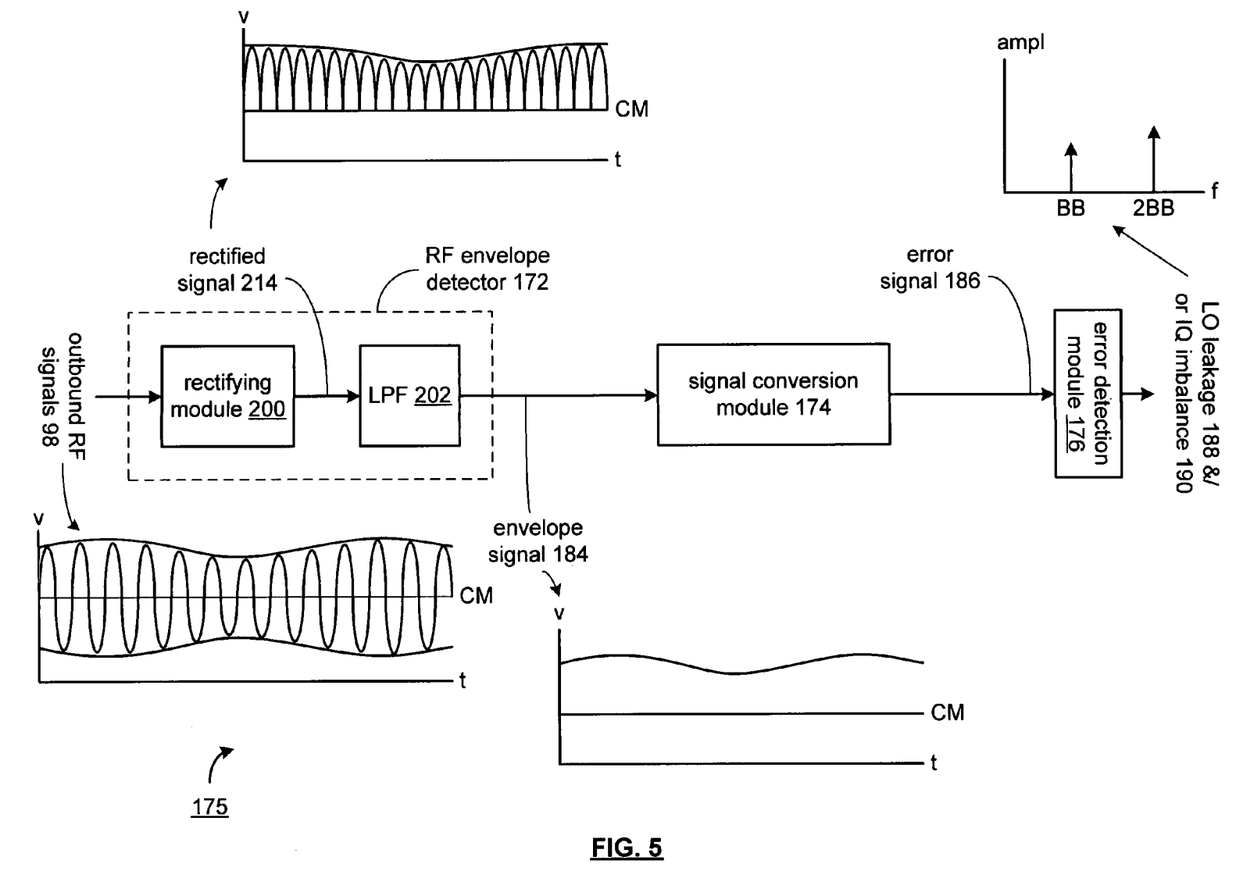
FIG. 5 is a schematic block diagram of an RF envelope detector and signal conversion module in accordance with the present invention.

FIG. 5 is a schematic block diagram of the RF transmission error detection module 175 coupled to the error detection module 176. As shown, the RF transmission error detection module 175 includes the RF envelope detector 172 and the signal conversion module 174. The RF envelope detector 172 includes a rectifying module 200 and a low pass filter 202.

In operation, the rectifying module 200 is operably coupled to receive the RF signals 98. As shown, the outbound RF signals 98 include a high frequency signal centered about a common mode voltage (CM) and has a ripple component that is due to IQ imbalance (e.g., imperfect image rejection) and/or LO leakage (e.g., component tolerance variations within the mixers). The rectifying module 200 rectifies the outbound RF signals 98 to produce a rectified signal 214. The rectified signal 214 is shown to have a positive signal component with respect to the common mode voltage (CM) and a corresponding varying magnitude.

The low pass filter 202 filters the rectified signal 214 to produce the envelope signal 184. The envelope signal 184 has a positive magnitude that varies with respect to the common mode voltage. As one of ordinary skill in the art will appreciate, the polarity and/or magnitude of the error signal 186 and of the rectified signal 214 with respect to the common mode are a matter of design choices and/or available power supply voltages.

The error detection module 176, which may be a fast Fourier transform module, converts the time domain error signal 186 into a frequency domain signal corresponding to LO leakage 188 and/or IQ imbalance 190. In this illustration, the frequency domain representation of the error signal 186 includes a component at baseband (BB) if the RF signals 98 include an LO leakage component 188. The frequency domain representation of the error signal 186 includes a 2× baseband component (2 BB) when the RF signals 98 include an IQ imbalance component 190. Accordingly, by determining the baseband component and the 2× baseband component, the correction module 176 can compensate for LO leakage and/or IQ imbalance based on signals 188 and 190.

Figure 6:
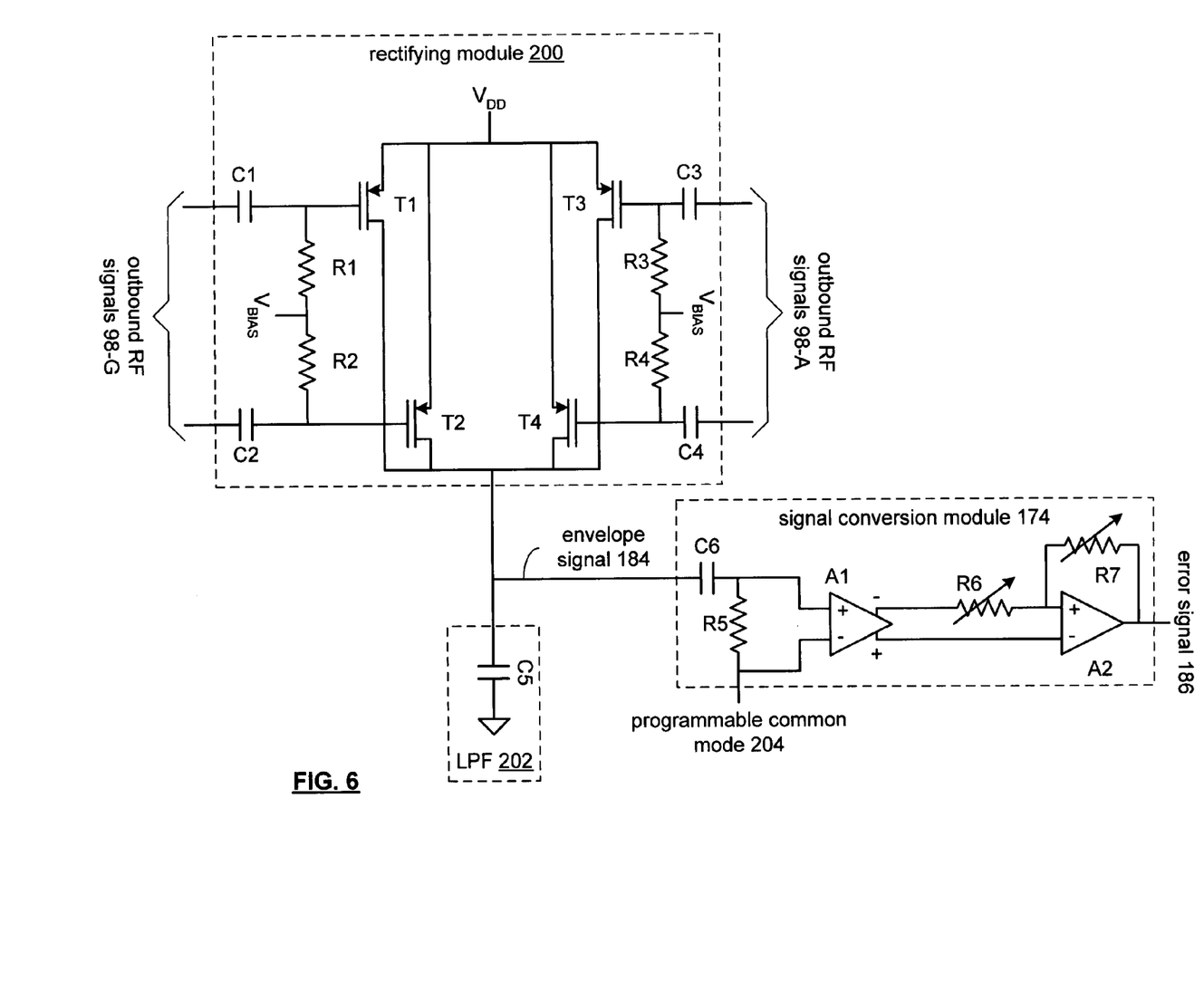
FIG. 6 is a schematic block diagram of a rectifying module in accordance with the present invention.

FIG. 6 is a schematic block diagram of an embodiment of the rectifying module 200, the low pass filter 202, and the signal conversion module 174. The rectifying module 200 includes a plurality of capacitors C1-C4, a plurality of resistors R1-R4, and a plurality of transistors T1-T4 interoperably coupled to provide a multiple differential input rectifier. As shown, one differential input may receive RF signals 98-G that are compliant with IEEE 802.11g (e.g., signals in the 2.4 GHz frequency band) while the other input may receive RF signals 98-A that are compliant with IEEE 802.11a (e.g., signals in the 5 GHz frequency band). Accordingly, C1, C2, R1 and R2 are tuned for 2.4 GHz operation and C3, C4, R3, and R4 are tuned for 5 GHz operation.

To rectify an incoming RF signal (e.g., RF signals 98-G), capacitors C1 and C2 AC coupled the RF signals to transistors T1 and T2, which are biased via resistors R1 and R2 and a bias voltage ($V_{BIAS}$). With the sources of T1 and T2 coupled together, a differential sinusoidal, signal inputted to transistors T1 and T2 produce a rectified representation of the differential sinusoidal signal at the sources of the transistors as was shown in FIG. 5.

The rectified signal is then filtered via the low pass filter 202, which may be a capacitor C5, to produce the envelope signal. The value of capacitor C5 is dependent on the desired low pass filtering, the current levels through the transistors, and/or the input impedance of the signal conversion module 174.

The signal conversion module 174 includes a differential amplifier A1 and a differential to single-ended amplifier A2. As shown, the inverting input of the differential amplifier A1 is coupled to receive a programmable common mode voltage 204. In this embodiment, the differential amplifier A1 amplifies the envelope signal 184 with respect to the programmable common mode voltage 204, which, in an alterative embodiment, may be a fixed voltage. The differential to single-ended amplifier A2 converts the differential output of the differential amplifier A1 into a single-ended error signal 186 based on the gain provided by adjustable resistors R6 and R7.

Figure 7:
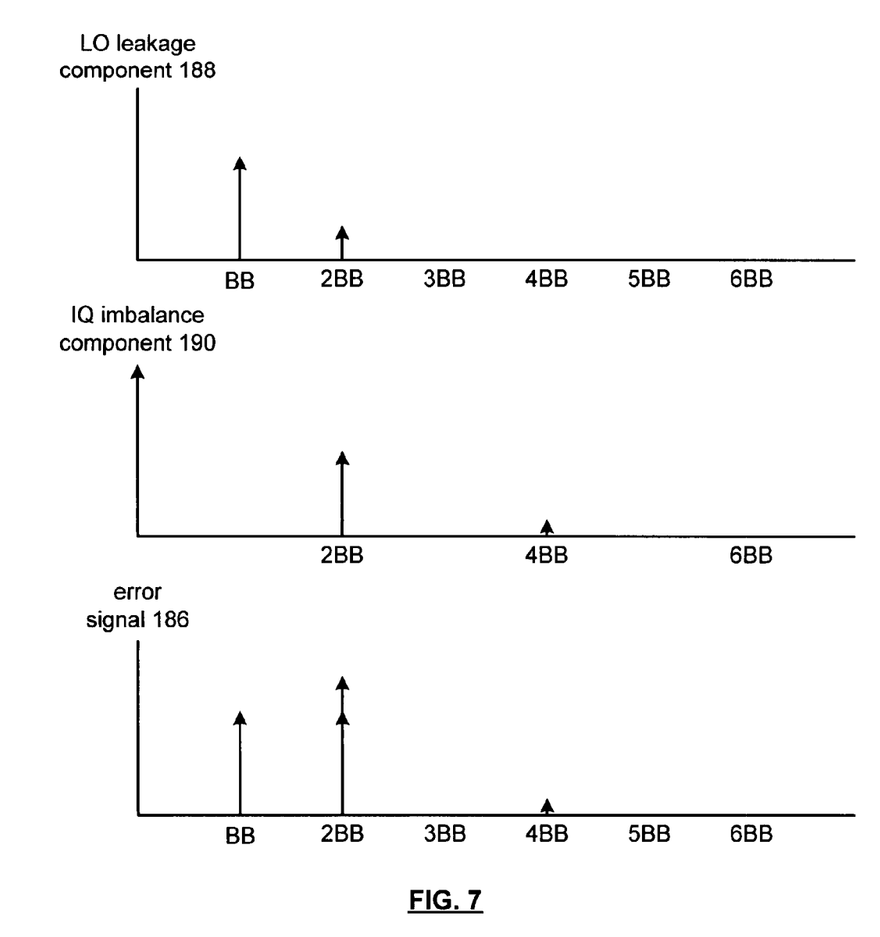
FIG. 7 is a frequency domain diagram of signals in accordance with the present invention.

FIG. 7 illustrates a frequency domain representation of an LO leakage component 188, an IQ imbalance component 190 and the corresponding frequency domain error signal 186. As shown, the LO leakage component 188 includes a fundamental frequency corresponding to the baseband frequency of the signal, which may range from a few hundred hertz to a few tens of megahertz. In addition, the LO leakage component 230 includes a harmonic component at 2× baseband, and further includes insignificant harmonic components at 3× baseband, 4× baseband, et cetera.

The IQ imbalance component 190 includes a fundamental frequency at 2×baseband and a harmonic component at 4× baseband and further includes insignificant harmonic components at 6× baseband, et cetera. The frequency domain representation of the error signal 186 includes the summation of the LO leakage component 188 and the IQ imbalance component 190. For example, the frequency domain representation of the error signal 186 includes, at the 2× baseband frequency, the fundamental frequency of the IQ imbalance component 190 and the first harmonic frequency of the LO leakage component 188. Thus, the magnitude of the frequency domain representation of the error signal 186 at the 2× baseband is not fully attributable to the IQ imbalance component 190. Accordingly, the correction module 178 makes simultaneous corrections for both LO leakage and IQ imbalance by adjusting the inputs to the summation modules 150 and 152 and the settings of mixers 154 and 156 within the up-conversion module 82. With the corrections made, the correction module 178 monitors the new error signal 186 for changes in the LO leakage component 188 and/or the IQ imbalance component 190. If both have improved to an acceptable level, the correction module 178 maintains these settings until further correction is needed. If, however, the LO leakage component 188 and/or the IQ imbalance component 190 has not improved to an acceptable level, the correction module 178 repeats the correction process until an acceptable level is reached and/or until best correction for this transmission is reached.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "compares favorably", as may be used herein, indicates that a comparison between two or more elements, items, signals, etc., provides a desired relationship.

For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

The preceding discussion has presented an apparatus for detecting and correcting RF transmission errors within a wireless communication device in a dynamic manner. As one of average skill in the art will appreciate, other embodiments may be derived from the teaching of the present invention without deviating from the scope of the claims.

What is claimed is:

1. A radio frequency (RF) transmission error detection module comprises:
    an RF envelope detector operably coupled to produce an envelope signal from a transmit RF signal, wherein the envelope signal represents both a local oscillation leakage and in-phase (I) and quadrature (Q) imbalance;
    signal conversion module operably coupled to convert the envelope signal into an error signal in accordance with baseband processing of the transmit RF signal, wherein the signal conversion module comprises:
        a differential operational amplifier having a first input, a second input, a first output, and a second output, wherein the first input of the differential amplifier is operably coupled to receive the envelope signal and the second input of the differential amplifier is operably coupled to receive a common mode voltage; and
        a differential to single-ended operational amplifier having a first input, a second input, and an output, wherein the first input of the differential to single-ended operational amplifier is operably coupled to the second output of the differential operational amplifier and the second input of the differential to single-ended operational amplifier is operably coupled to the first output of the differential operational amplifier, wherein the output of the differential to single-ended operational amplifier provides the error signal; and
    error detection module operably coupled to determine a local oscillation leakage value and an I and Q imbalance value from the error signal.

2. The RF transmission error detection module of claim 1, wherein the RF envelope detector comprises:
    a rectifying module operably coupled to rectify the transmit RF signal with respect to a common mode voltage to produce a rectified signal; and
    a low pass filter operably coupled to filter the rectified signal to produce the envelope signal.

3. The RF transmission error detection module of claim 2, wherein the rectifying module comprises:
    a differential input single ended output module to produce a single ended rectified signal as the rectified signal from the transmit RF signal, wherein the transmit RF signal is a differential signal.

4. The RF transmission error detection module of claim 1, wherein the common mode voltage comprises:
    a programmable common mode voltage.

5. A radio frequency (RF) transmission correction module comprises:
    an RF envelope detector operably coupled to produce an envelope signal from a transmit RF signal, wherein the envelope signal represents a local oscillation leakage and an in-phase (I) and quadrature (Q) imbalance;
    signal conversion module operably coupled to convert the envelope signal into an error signal in accordance with baseband processing of the transmit RF signal;
    error detection module operably coupled to determine a local oscillation leakage value and an I and Q imbalance value from the error signal, wherein the error detection module comprises:
        a time domain to frequency domain conversion module operably coupled to convert the error signal from a time domain to a frequency domain, wherein the error signal includes, in the frequency domain, a local oscillation leakage component and an I and Q imbalance component; and
    correction module operably coupled to produce a local oscillation leakage correction signal and an I and Q imbalance correction signal based on the local oscillation leakage value and the I and Q imbalance value, respectively, wherein the correction module further functions to:
        determine magnitude of the local oscillation leakage component;
        determine magnitude of the I and Q imbalance component;
        generate the at least one of the local oscillation leakage correction signal and the I and Q imbalance correction signal based on the magnitude of the local oscillation leakage component and the magnitude of the I and Q imbalance component such that at least one of I mixer gain is adjusted, Q mixer gain is adjusted, I offset is adjusted, and Q offset is adjusted.

6. The RF transmission correction module of claim 5, wherein the RF envelope detector comprises:
    a rectifying module operably coupled to rectify the transmit RF signal with respect to a common mode voltage to produce a rectified signal; and
    a low pass filter operably coupled to filter the rectified signal to produce the envelope signal.

7. The RF transmission correction module of claim 5, wherein the signal conversion module comprises:
    a differential operational amplifier having a first input, a second input, a first output, and a second output, wherein the first input of the differential amplifier is operably coupled to receive the envelope signal and the second input of the differential amplifier is operably coupled to receive a common mode voltage; and
    a differential to single-ended operational amplifier having a first input, a second input, and an output, wherein the first input of the differential to single-ended operational amplifier is operably coupled to the second output of the differential operational amplifier and the second input of the differential to single-ended operational amplifier is operably coupled to the first output of the differential operational amplifier, wherein the output of the differential to single-ended operational amplifier provides the error signal.

8. The RF transmission correction module of claim 7, wherein the common mode voltage comprises:
    a programmable common mode voltage.

9. A radio frequency (RF) transmitter comprises:
    a baseband processing module operably coupled to convert outbound data into outbound baseband signals;

offset correction module operably coupled to adjust the outbound baseband signals based on an offset to produce adjusted outbound baseband signals;

a low pass filter module operably coupled to low pass filter the adjusted outbound baseband signals to produce filtered outbound baseband signals;

mixing module operably coupled to mix, in accordance with a mixing adjust signal, the filtered outbound baseband signals with a local oscillation to produce up-converted outbound signals;

amplifier stage operably coupled to amplify the up-converted outbound signals to produce transmit radio frequency (RF) signals; and an RF transmission correction module that includes:
an RF envelope detector operably coupled to produce an envelope signal from the transmit RF signals, wherein the envelope signal represents both a local oscillation leakage and an in-phase (I) and quadrature (Q) imbalance;

signal conversion module operably coupled to convert the envelope signal into an error signal in accordance with processing of the baseband processing module;

error detection module operably coupled to determine a local oscillation leakage value and an I and Q imbalance value from the error signal, wherein the error detection module comprises a time domain to frequency domain conversion module operably coupled to convert the error signal from a time domain to a frequency domain, wherein the error signal includes, in the frequency domain, a local oscillation leakage component and an I and Q imbalance component; and correction module operably coupled to produce the offset and the mixing adjust signal based on the local oscillation leakage value and the I and Q imbalance value, wherein the correction module further functions to:
  determine magnitude of the local oscillation leakage component;
  determine magnitude of the I and Q imbalance component; and
  generate the at least one of the offset and the mixing adjust signal based on the magnitude of the local oscillation leakage component and the magnitude of the I and Q imbalance component such that at least one of I mixer gain of the mixing module is adjusted, Q mixer gain of the mixing module is adjusted, I offset of the offset is adjusted, and Q offset of the offset is adjusted.

10. The RF transmitter of claim 9, wherein the RF envelope detector comprises:
a rectifying module operably coupled to rectify the transmit RF signal with respect to a common mode voltage to produce a rectified signal; and
a low pass filter operably coupled to filter the rectified signal to produce the envelope signal.

11. The RF transmitter of claim 9, wherein the signal conversion module comprises:
a differential operational amplifier having a first input, a second input, a first output, and a second output, wherein the first input of the differential amplifier is operably coupled to receive the envelope signal and the second input of the differential amplifier is operably coupled to receive a common mode voltage; and
a differential to single-ended operational amplifier having a first input, a second input, and an output, wherein the first input of the differential to single-ended operational amplifier is operably coupled to the second output of the differential operational amplifier and the second input of the differential to single-ended operational amplifier is operably coupled to the first output of the differential operational amplifier, wherein the output of the differential to single-ended operational amplifier provides the error signal.

12. The RF transmitter of claim 11, wherein the common mode voltage comprises:
a programmable common mode voltage.

* * * * *